United States Patent
Foxworthy (10) Patent No.: US 10,664,550 B1
(45) Date of Patent: May 26, 2020

(54) TECHNOLOGIES FOR WEB DOMAIN RANKING WITH TEMPORAL EFFECTS WITHIN COMPETITIVE NETWORK ENVIRONMENTS

(71) Applicant: DemandJump, Inc., Indianapolis, IN (US)

(72) Inventor: Tyler Foxworthy, Indianapolis, IN (US)

(73) Assignee: DemandJump, Inc., Indianapolis, IN (US)

(*) Notice: Subject to any disclaimer, the term of this patent is extended or adjusted under 35 U.S.C. 154(b) by 284 days.

(21) Appl. No.: 15/886,022

(22) Filed: Feb. 1, 2018

Related U.S. Application Data (60) Provisional application No. 62/455,815, filed on Feb. 7, 2017.

(51) Int. Cl.
*G06F 13/00* (2006.01)
*G06F 16/958* (2019.01)
*G06F 17/18* (2006.01)
*H04L 12/24* (2006.01)

(52) U.S. Cl.
CPC ............ *G06F 16/958* (2019.01); *G06F 17/18* (2013.01); *H04L 41/14* (2013.01)

(58) Field of Classification Search
CPC .... G06F 16/33; G06F 16/332; G06F 16/3322; G06F 16/958; G06F 17/18; H04L 61/3025; H04L 61/3015; H04L 41/14
USPC ................................................ 709/249, 245
See application file for complete search history.

(56) References Cited

U.S. PATENT DOCUMENTS

| | | | | |
|---|---|---|---|---|
| 10,353,973 | B2* | 7/2019 | Cora | G06F 16/335 |
| 10,375,017 | B2* | 8/2019 | Kakhki | H04L 61/1511 |
| 10,387,959 | B2* | 8/2019 | Kamdar | G06F 16/3322 |
| 2017/0195285 | A1* | 7/2017 | Kakhki | H04L 61/302 |
| 2018/0052936 | A1* | 2/2018 | Cora | G06N 7/005 |
| 2018/0211320 | A1* | 7/2018 | Kamdar | G06Q 40/06 |
| 2019/0286679 | A1* | 9/2019 | Cora | G06N 7/005 |

OTHER PUBLICATIONS

Leskovec et al., The Dynamics of Viral Marketing, ACM Transactions on the Web (TWEB), 1(1):5, 2007.
(Continued)

*Primary Examiner* — Kenneth R Coulter
(74) *Attorney, Agent, or Firm* — Taft Stettinius & Hollister LLP (57) ABSTRACT

A method according to one embodiment includes mapping the competitive computer network environment based on network connections between web domains within the competitive computer network environment, wherein the web domains include at least a target domain and a plurality of source domains, determining persistence properties of the network connections between the web domains to identify network connections that are expected to persist for at least a threshold period of time, determining, for each source domain of the plurality of source domains having a network connection with the target domain expected to persist for at least the threshold period of time, a referral value indicative of an amount of network traffic directed from the source domain to the target domain, and ranking the source domains based on the corresponding referral values.

15 Claims, 8 Drawing Sheets

(56) References Cited

OTHER PUBLICATIONS

Horak et al., Persistent Homology of Complex Networks, Journal of Statistical Mechanics: Theory and Experiment, 2009(03):P03034, 2009.
Gomez Rodriguez et al., Influence Maximization in Continuous Time Diffusion Networks, arXiv preprint arXiv:1205.1682, 2012.
Gomez Rodriguez et al., Influence Maximization in Continuous Time Diffusion Networks, In 29th International Conference on Machine Learning (ICML 2012), pp. 1-8, International Machine Learning Society, 2012.
Kwitt et al., Statistical Topological Data Analysis—A Kernel Perspective, In Advances in Neural Information Processing Systems, pp. 3070-3078, 2015.
Chowdhury et al., Persistent Homology of Asymmetric Networks: An Approach Based on Dowker Filtrations, arXiv preprint arXiv:1608.05432, 2016.
Edelsbrunner et al., Computational Topology: An Introduction, American Mathematical Soc., 2010.
Chowdhury et al., Persistent Homology of Directed Networks, In 50th Asilomar Conference on Signals, Systems, and Computers, page to appear, IEEE, 2016.
Petri et al., Topological Strata of Weighted Complex Networks, PloS one, 8(6):e66506, 2013.
Edelsbrunner et al., Persistent Homology: Theory and Practice, In Proceedings of the European Congress of Mathematics, pp. 31-50, 2012.
Petri et al., Homological scaffolds of brain functional networks, Journal of The Royal Society Interface, 11 (101):20140873, 2014.
Ghrist, Barcodes: The Persistent Topology of Data, Bulletin of the American Mathematical Society, 45(1):61-75, 2008.
Barabasi et al., Scale-free characteristics of random networks: the topology of the world-wide web, Physica A: Statistical Mechanics and its Applications, 281(1):69-77, 2000.
Kempe et al., Maximizing the Spread of Influence through a Social Network, Theory of Computing, 11(4):105-147, 2015.
Gomez Rodriguez et al., Uncovering the Temporal Dynamics of Diffusion Networks, arXiv preprint arXiv:1105.0697, 2011.
Muruganandam, 17 Retargeting Ad Statistics That Will Make You Retarget Right Now [2 Infographics], <https://www.business2community.com/marketing/17-retargeting-ad-statistics-will-make-retarget-right-now-2-infographics-01464774>, retrieved on Dec. 13, 2018.
Leskovec et al., Cost-effective Outbreak Detection in Networks, In Proceedings of the 13th ACM SIGKDD international conference on Knowledge discovery and data mining, pp. 420-429. ACM, 2007.

* cited by examiner

TECHNOLOGIES FOR WEB DOMAIN RANKING WITH TEMPORAL EFFECTS WITHIN COMPETITIVE NETWORK ENVIRONMENTS

CROSS-REFERENCE TO RELATED APPLICATION

This application claims the benefit of U.S. Provisional Application Ser. No. 62/455,815 filed on Feb. 7, 2017, the contents of which are incorporated herein by reference in their entirety.

BACKGROUND

Unlike random networks, scale-free networks such as the Internet and other computer networks have been shown to form, for example, following a process referred to as preferential attachment. That is, in some embodiments, the more connected a node (e.g., a web domain) in the network, the more likely it is that current and future domains within the network will want to link to it. It should be appreciated that, depending on the particular circumstances, such linking may occur organically or through one or more incentive-based linking techniques.

Referral relationships between web domains are typically not static; instead, they may fluctuate in response to seasonality, trends, and the effects of competitive web traffic redirection efforts, among other exogenous factors. It should be appreciated that these dynamics pose significant challenges for traditional web domain ranking techniques.

SUMMARY

According to an embodiment, a method may include mapping the competitive computer network environment based on network connections between web domains within the competitive computer network environment, wherein the web domains include at least a target domain and a plurality of source domains; determining persistence properties of the network connections between the web domains to identify network connections that are expected to persist for at least a threshold period of time; determining, for each source domain of the plurality of source domains having a network connection with the target domain expected to persist for at least the threshold period of time, a referral value indicative of an amount of network traffic directed from the source domain to the target domain; and ranking the source domains based on the corresponding referral values.

In some embodiments, the referral value may be based on direct network traffic from the source domain to the target domain and indirect propagation of network traffic from the source domain to the target domain through at least one web domain intermediate the source domain and the target domain.

In some embodiments, the referral value may be further based on a deleterious effect on network traffic from the source domain to at least one web domain competitive to the target domain.

In some embodiments, the referral value may be determined according to $v_{ik} = v_{ik}^d + v_{ik}^p$, wherein $v_{ik}$ is the referral value of the source domain, i, to the target domain, k, wherein $v_{ik}^d$ is a direct value indicative of the direct network traffic from the source domain to the target domain, and wherein $v_{ik}^p$ is a propagation value indicative of the indirect propagation of network traffic from the source domain to the target domain.

In some embodiments, the propagation value, $v_{ik}^p$, indicative of the indirect propagation of network traffic from the source domain to the target domain may be determined according to $$\sum_{j \in \hat{V}} v_{ij}^d P(j \mid i) P(k \mid j \ldots i),$$

wherein $j \in \hat{V}$ is a subset of web domains within the competitive computer network environment having network connections with both the source domain and the target domain, wherein $v_{ik}^d$ is a value indicative of direct network traffic from the source domain, i, to an intermediate web domain, j, wherein $P(j|i)$ is a conditional probability of a link from the source domain to the intermediate web domain, and wherein $P(k|j \ldots i)$ is a conditional probability of a link from the source domain to the intermediate domain and subsequently from the intermediate domain to the target domain, k.

In some embodiments, mapping the competitive computer network environment may include determining network traffic between the web domains within the competitive computer network environment.

In some embodiments, determining the network traffic between the web domains may include retrieving traffic data from a database.

In some embodiments, mapping the competitive computer network environment may include isolating a subgraph of a scale-free graph of the Internet including the target domain and a set of competitive web domains.

In some embodiments, isolating the subgraph may include isolating a subgraph that further includes each web domain connected to one or more of the target domain or a competitive domain by no more than a threshold number of network connections.

In some embodiments, the threshold number of network connections may be between two connections and three connections.

In some embodiments, the web domains may include a plurality of target domains, the target domains may include at least one competitive web domain, and the method may further include determining the referral value and ranking the source domains based on the corresponding referral values for each target domain of the plurality of target domains.

According to another embodiment, a computing system may include at least one processor and at least one memory comprising a plurality of instructions stored thereon that, in response to execution by the at least one processor, causes the computing system to map a competitive computer network environment based on network connections between web domains within the competitive computer network environment, wherein the web domains include at least a target domain and a plurality of source domains; determine persistence properties of the network connections between the web domains to identify network connections that are expected to persist for at least a threshold period of time; determine, for each source domain of the plurality of source domains having a network connection with the target domain expected to persist for at least the threshold period of time, a referral value indicative of an amount of network traffic directed from the source domain to the target domain; and rank the source domains based on the corresponding referral values.

In some embodiments, the referral value may be based on direct network traffic from the source domain to the target domain and indirect propagation of network traffic from the source domain to the target domain through at least one web domain intermediate the source domain and the target domain.

In some embodiments, the referral value may be further based on a deleterious effect on network traffic from the source domain to at least one web domain competitive to the target domain.

In some embodiments, the referral value may be determined according to $v_{ik}=v_{ik}^d+v_{ik}^p$, wherein $v_{ik}$ is the referral value of the source domain, i, to the target domain, k, wherein $v_{ik}^d$ is a direct value indicative of the direct network traffic from the source domain to the target domain, and wherein $v_{ik}^p$ is a propagation value indicative of the indirect propagation of network traffic from the source domain to the target domain.

In some embodiments, the propagation value, $v_{ik}^p$, indicative of the indirect propagation of network traffic from the source domain to the target domain is determined according to $$\sum_{j\in\hat{V}} v_{ij}^d P(j\mid i) P(k\mid j\ldots i),$$

wherein $j\in\hat{V}$ is a subset of web domains within the competitive computer network environment having network connections with both the source domain and the target domain, wherein $v_{ij}^d$ is a value indicative of direct network traffic from the source domain, i, to an intermediate web domain, j, wherein $P(j|i)$ is a conditional probability of a link from the source domain to the intermediate web domain, and wherein $P(k|j \ldots i)$ is a conditional probability of a link from the source domain to the intermediate domain and subsequently from the intermediate domain to the target domain, k.

In some embodiments, the mapping of the competitive computer network environment may include isolation of a subgraph of a scale-free graph of the Internet that includes the target domain and a set of competitive web domains.

In some embodiments, the subgraph may further include each web domain connected to one or more of the target domain or a competitive domain by no more than a threshold number of network connections.

In some embodiments, the web domains may include a plurality of target domains, the target domains may include at least one competitive web domain, and the plurality of instructions may further cause the computing system to determine the referral value and rank the source domains based on the corresponding referral values for each target domain of the plurality of target domains.

According to yet another embodiment, one or more non-transitory machine-readable media may include a plurality of instructions stored thereon that, in response to execution by a computing device, causes the computing device to map a competitive computer network environment based on network connections between web domains within the competitive computer network environment, wherein the web domains include at least a target domain and a plurality of source domains; determine persistence properties of the network connections between the web domains to identify network connections that are expected to persist for at least a threshold period of time; and determine, for each source domain of the plurality of source domains having a network connection with the target domain expected to persist for at least the threshold period of time, a referral value indicative of an amount of network traffic directed from the source domain to the target domain.

Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

The techniques described herein relate to a system and methods for analyzing linked web-based referral networks, for example, with vector value attributes over time. In particular, in some embodiments, the techniques provide a mechanism for ranking web domains based on increasing user traffic to a specific target web domain through both direct and indirect web traffic redirection and through deleterious effects to competitive web domains.

More specifically, as described below, the system and methods described herein leverage the structure and referral dynamics within the directed sub-network defined h steps from a finite set of competitive web domains (i.e., a competitive referral ecosystem (CRE)) to generate a target-specific ranking of web domains according to their ability to increase network traffic to the target domain through the direct referral of users, indirect "pass through" or "propagation" traffic, and deleterious effects to the web domains that compete with the target domain.

It should be appreciated that differences in connectivity and temporal network traffic patterns between web domains in the network may lead to drastically varying propagation values. As such, while two sources might drive the same direct volume of network traffic to a particular website, one of those sources may drive traffic to additional sites in the competitive referral ecosystem that have more desirable properties (e.g., more likely to further redirect traffic to a target domain).

An underlying principle of propagation is that repeated exposure to network traffic redirection attempts may increase the click-through rate (CTR) within a variable time frame. Accordingly, by prioritizing network traffic redirection opportunities in the competitive referral ecosystem with higher propagation value to a target domain and its competitors, greater overall traffic redirection to the target domain may be observed compared to redirection motivated solely by direct or last-click traffic redirection.

Although the structure of computer networks may follow a classical scale-free preferential attachment model, the potential for mixed temporal dynamics often makes the problem of estimating the value of a particular web domain to a specific domain target considerably more complex. For propagation effects to occur, there must generally be a network path between three nodes (e.g., web domains) that persists over some interval of time: the network path between a source domain, a target domain, and an intermediate domain that shares a network connection with both the source domain and the target domain.

In a traditional setting, the dynamics of an undirected weighted network may be described completely by the set of eigenvalues according to the spectral theorem; however, this approach relies on an underlying assumption of symmetry that does not extend to directed networks or to those networks whose edge weights vary non-trivially with time. Furthermore, very dense networks are particularly difficult to characterize meaningfully via these techniques. For example, existing graphical algorithms for estimating node/domain importance typically require the use of a binary adjacency matrix, but there are no widely accepted spectral techniques for thresholding weighted networks without loss of information.

As described below, persistent homology provides a path to analyze multi-scale directed networks by identifying important topological features (n-dimensional simplical complexes) over an increasing edge-weight filtration without loss of information. As such, the techniques described herein allow the system to avoid difficulties associated with choosing an edge weight threshold and instead allow the analysis of the computer network topology as a sequence of filtrations with no loss of structural or temporal information.

Figure 1:
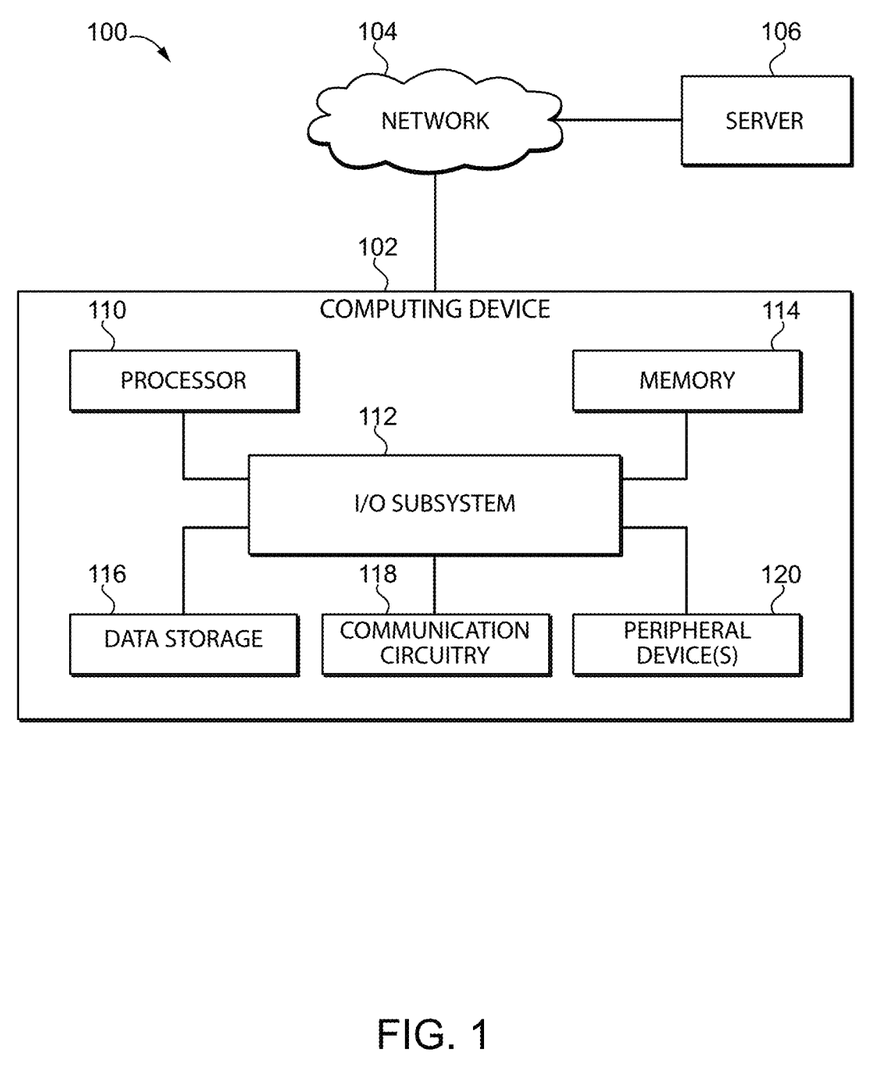
FIG. 1 is a simplified block diagram of a system for web domain ranking with temporal effects within competitive network environments.

Referring now to FIG. 1, in the illustrative embodiment, an illustrative system 100 for web domain ranking with temporal effects within competitive network environments includes a computing device 102, a network 104, and a server 106. The computing device 102 may be embodied as any type of computing device capable of performing the functions described herein. For example, the computing device 102 may be embodied as a desktop computer, laptop computer, tablet computer, notebook, netbook, Ultrabook™, cellular phone, smartphone, wearable computing device, personal digital assistant, mobile Internet device, Internet of Things (IoT) device, server, router, switch, and/or any other computing/communication device capable of performing the functions described herein. As shown in FIG. 1, the illustrative computing device 102 includes a processor 110, an input/output ("I/O") subsystem 112, a memory 114, data storage 116, a communication circuitry 118, and one or more peripheral devices 120. Of course, the computing device 102 may include other or additional components, such as those commonly found in a typical computing device (e.g., various input/output devices and/or other components), in other embodiments. Additionally, in some embodiments, one or more of the illustrative components may be incorporated in, or a portion thereof, may be incorporated in the processor 110 in some embodiments. Although a single computing device 102 is illustratively shown, it should be appreciated that one or more of the components of the computing device 102 described herein may be distributed across multiple computing devices. In other words, the techniques described herein may be employed by a computing system that includes one or more computing devices.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the computing device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the computing device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the computing device 102, on a single integrated circuit chip. For example, in some embodiments, one or more of the components of the computing device 102 may form one or more application-specific integrated circuits (ASICs).

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data during operation of the computing device 102 useful for performing the functions described herein.

The communication circuitry 118 may be embodied as any communication circuit, device, or collection thereof, capable of enabling communications between the computing device 102 and other remote devices (e.g., the server 106) over a network (e.g., the network 104). The communication circuitry 118 may be configured to use any one or more communication technologies (e.g., wireless or wired communications) and associated protocols (e.g., Ethernet, Bluetooth®, Wi-Fi®, WiMAX, etc.) to effect such communication.

The peripheral devices 120 may include any number of additional peripheral or interface devices, such as speakers, microphones, additional storage devices, and so forth. The particular devices included in the peripheral devices 120 may depend on, for example, the type and/or intended use of the computing device 102. For example, in some embodiments, the peripheral devices 120 may include a keyboard, mouse, display, touchscreen display, printer, alarm, status indicator, handheld device, diagnostic tool, reader device, and/or one or more other suitable peripheral devices 120.

The network 104 may be embodied as any type of communication network capable of facilitating communication between the computing device 102 and remote devices (e.g., the server 106). As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), ad hoc networks, short-range communication links, or a combination thereof. Depending on the particular embodiment, the network 104 may form a portion of the competitive referral ecosystem described herein or may be separate from the competitive referral ecosystem. For example, in some embodiments, the network 104 may be a separate network for facilitating communication between the computing device 102 and the server 106.

The server 106 may be embodied as any type of computing device capable of performing the functions described herein. For example, the server 106 may be embodied as a server, desktop computer, laptop computer, tablet computer, notebook, netbook, Ultrabook™ cellular phone, smartphone, wearable computing device, personal digital assistant, mobile Internet device, Internet of Things (IoT) device, router, switch, and/or any other computing/communication device capable of performing the functions described herein. In some embodiments, the server 106 may be similar to the computing device 102 described above. For example, the server 106 may include components similar to the components of the computing device 102 described above and, therefore, the descriptions of those components have not been repeated herein for clarity of the description. Further, it should be appreciated that the server 106 may include other components, sub-components, and/or devices commonly found in a computing device, which are not discussed herein for clarity of the description. Additionally, in some embodiments, one or more of the components of the computing device 102 may be omitted from the server 106 (e.g., the peripheral devices 160). For example, in some embodiments, network traffic data and/or other data associated with the competitive referral ecosystem may be received by the computing device 102 from the server 106.

Although only one computing device 102, one network 104, and one server 106 are shown in the illustrative embodiment of FIG. 1, the system 100 may include multiple computing device 102, networks 104, and/or server 106 in other embodiments. For example, in some embodiments, the computing device 102 may communicate with multiple servers 106. Further, in some embodiments, it should be appreciated that the computing device 102 may perform all of the functions described herein (e.g., the functions of both the computing device 102 and the server 106). In such embodiments, the network 104 and the server 106 may be omitted from the system 100.

Figure 2:
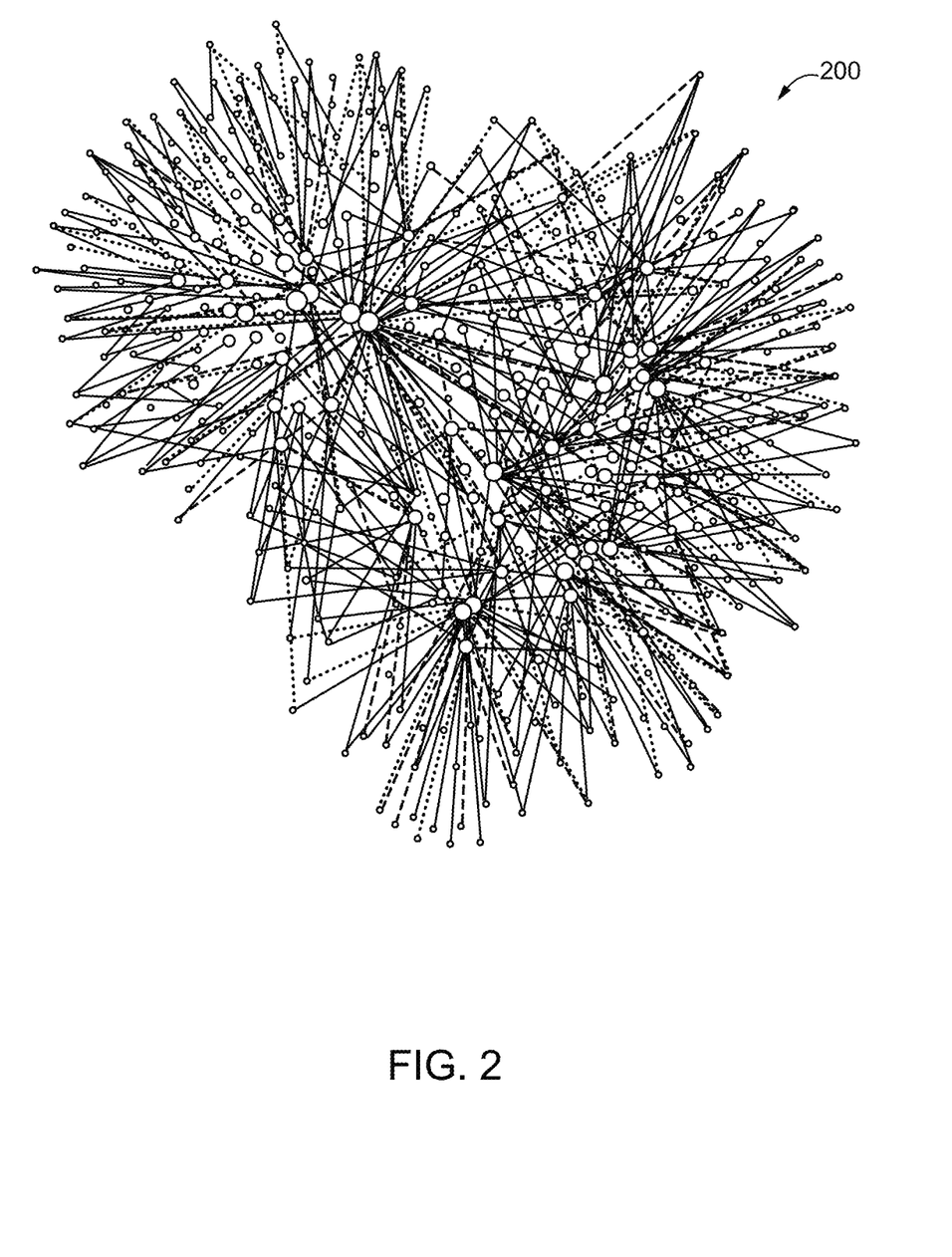
FIG. 2 is a simplified graphical diagram of at least one embodiment of a competitive referral ecosystem.

Competitive referral ecosystems or environments such as the illustrative competitive referral ecosystem 200 of FIG. 2 may arise from a variety of continuous time diffusion processes that characterize the flow of network traffic (e.g., of users) between web domains over time. In some embodiments, a competitive referral ecosystem may be defined as a temporal graph, $G^c(t)=\{E(t),V\}$, having nodes V with edges E of varying directed weight $w_{i,j}(t)$ reflecting the directed amount or rate of traffic from node i to node j. As described above, the nodes of $G^c(t)$ may correspond with the web domains of the network. A critical aspect of G is that of being a subgraph (e.g., sub-network) of the larger scale-free graph of the broader Internet containing a subset of competitive web domains $V_c$ and their neighbors within the pre-defined distance h described above (i.e., a sub-network including the competitive domain and each web domain connected to that domain by h or fewer total connections). It should be appreciated that the edges of the competitive referral ecosystem 200 are shown with different line styles based on different temporal dynamics, which illustrates the heterogeneity of the temporal distributions. In particular, the different line styles represent different styles of time series encountered when examining the edge weights between two nodes/domains over time. For example, without loss of generality, the competitive referral ecosystem 200 illustrates a "seasonal" pattern (i.e., not limited to calendar-based seasons) of network traffic between two domains with a dashed line, a constant flow of network traffic between two domains with a solid line, and a linear growth pattern of network traffic between two domains with a dotted line.

It should be appreciated that, by virtue of preferential attachment, many competitors of a target domain may be aware of a common set of referral domains and may seek network traffic redirection opportunities with those domains due to their inherent traffic-generating potential. Common referral sources between competitors are less likely to exist under the preferential attachment model of a computer network than isolated referral sources and, therefore, indicate a higher degree of value to the those web domains interested in increasing redirected traffic. As such, a target domain that is currently not connected to the network may find increasing value in a particular source as its competitors gain web traffic from that source.

Click-through rate commonly describes the proportion of users who click on a specific link resulting in redirection to another web domain. Although typically reported as a static value, the techniques described herein characterize domain-specific click-through rate as a continuous random variable with a temporally varying rate (e.g., generally at or below 0.01) and varying by one or more exogenous factors. Due to the exceedingly low probability of repeated user-initiated web domain redirection (e.g., long click cascades), the method described herein allocates $2 \leq h \leq 3$. In other words, in the illustrative embodiment, the competitive referral ecosystem includes a sub-network of the Internet including the competitive domain and each web domain connected to that domain by two or fewer total connections, or by three or fewer total connections, depending on the particular embodiment (i.e., h=2 or h=3).

In the illustrative embodiment, for any given source and target domain, i and k respectively, the total value $v_{ik}$ of a link from node i to node k over a finite interval may be determined according to $$v_{ik} = v_{ik}^d + v_{ik}^p = v_{ik}^d + \sum_{j \in \hat{V}} v_{ij}^d P(j \mid i) P(k \mid j \ldots i),$$

which decomposes the direct observable value $v_{ik}^d$ from the indirect propagation of value $v_{ik}^p$ through the relationships of i with the subset of nodes $j \in \hat{V}$ having a mutual relationship with k. It should be appreciated that P(j|i) is the conditional probability of a link/transition (e.g., a user-initiated web domain redirection by virtue of "clicking" a hyperlink) to node j from node i and P(k|j . . . i) is the conditional probability of a link/transition to node j from i and to node k from node j (i.e., in that sequence). In some embodiments, the computing device 102 receives the values (e.g., in the form of raw data and/or probabilities) associated with the network traffic in the competitive referral ecosystem such that $v_{ik}$ may be determined according to the relationship described above. It should be appreciated that the computing device 102 and/or the server 106 may analyze the raw network data to determine those values depending on the particular embodiment. In some embodiments, uniform probability may be assumed (e.g., if the actual probabilities are unknown or undeterminable). Further, in some embodiments, the computing device 102 may utilize a suitable function to normalize for significant variations in network traffic, inaccuracies in the underlying data, and/or other variables. For example, in some embodiments, the computing device 102 may leverage a log transform of the data or a log-likelihood (e.g., for transition probabilities) to simplify the analysis of the network traffic.

Figure 3:
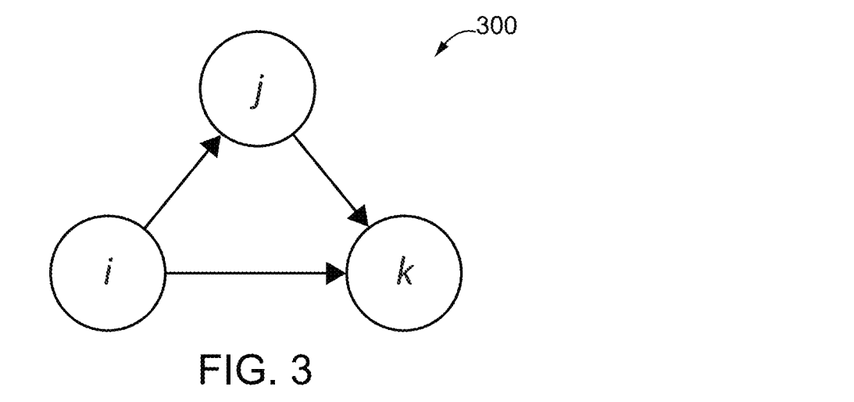
FIG. 3 is a simplified block diagram of at least one embodiment of a propagation cycle.

In some embodiments, a set of competitors $V^c$ of the target domain may be known to the system 100. In such embodiments, the total value $v_{ik}$ of the link from node i to node k over a finite interval may be determined according to $$v_{ik} = v_{ik}^d + v_{ik}^p + \gamma \sum_{c \in V^c} v_{ic}$$

if the effect of node i on node k would have a deleterious effect on the source's contribution of value to the competitive set, where the term $$\gamma \sum_{c \in V^c} v_{ic}$$

corresponds with that deleterious effect. A simple propagation cycle 300 is illustrated in FIG. 3 in the form a directed graph including nodes/domains i, j, and k. As shown, web traffic may directly link from node i to node k or may directly link from node i to node j and be redirected from node j to node k.

Unlike simplified models, real-world environments have not only multiple scales, but also mixed temporal dynamics due, for example, to seasonality and other factors. Although network edges are often deterministic, the result of various higher dimensional topological features of the competitive referral ecosystem may be the result of random effects rather than cooperation. In some embodiments, the techniques described herein may utilize persistent homology to identify sub-networks $\hat{G}$ in the competitive referral ecosystem that will result in network propagation effects based on persistent similarity between temporal directed weights $w_{ij}(t)$, thereby identifying paths for network traffic (e.g., users) to continuously flow from a source domain to a target domain. As indicated above, a propagation effect occurs when a user has an increased probability of clicking on a link from j to k due to a previous independent transition from i to j where P(k|i)>0 due to an existing link on i.

It should be appreciated that the aim of persistent homology is to track the "birth" and "death" of topological features in a simplical complex defined on a topological space $K_x^\epsilon$ for different values of $\epsilon$ and in varying dimensions. The lifespan of each homology class is an interval defined over the filtration parameters in which a homology class is extant, and a persistence barcode is a collection of all persistence intervals associated to a space. Real-world computer networks involve one-dimensional persistent cycles at all scales, while short-lived generators indicate the presence of local organization properties at different scales. In other words, the methods of persistent homology allow the identification of a set of web domains that are connected and whose connections are expected to persist for at least a threshold period of time. To do so, the system 100 may track the "life and death" of topological features over time associated with the competitive referral ecosystem (e.g., to identify a stable mode in the network). Further, the topological features may be characterized at various levels of generality (e.g., micro vs. macro) depending on the particular embodiment. In the illustrative embodiment, the system 100 considers persistence properties of pairwise edges in the network for the purposes of identifying cycles that are temporally aligned on an interval such that propagation effects are supported.

Figure 4:
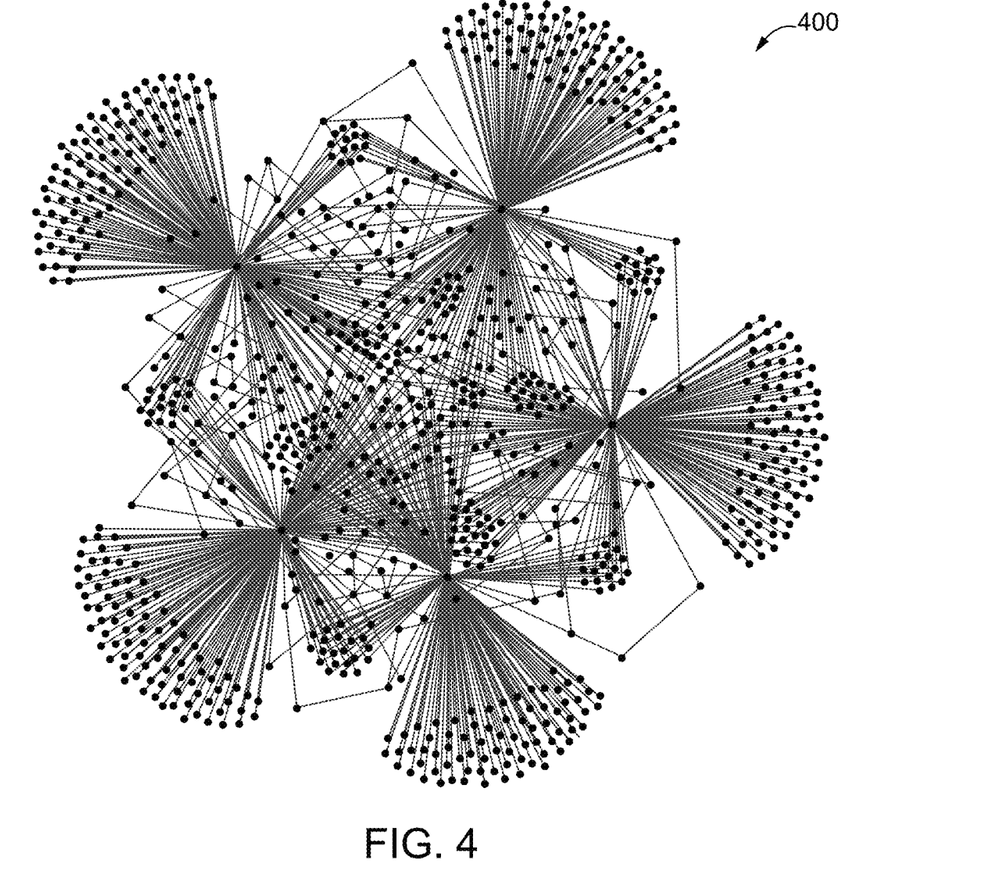
FIG. 4 is a simplified graphical diagram of at least one other embodiment of a competitive referral ecosystem.
Figure 5A:
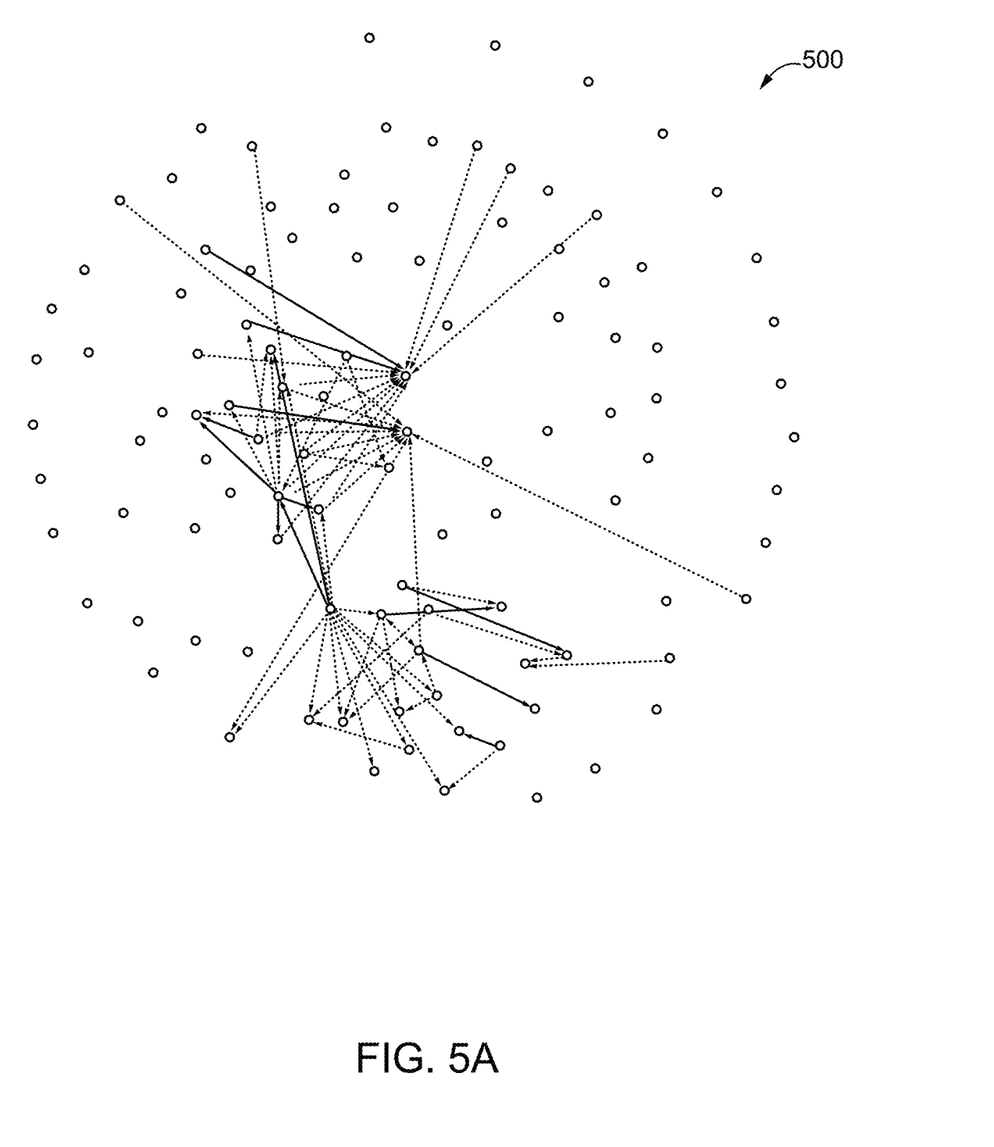
FIGS. 5A-D are simplified graphical diagrams of a competitive referral ecosystem around a central target domain with under decreasing filtration.
Figure 5B:
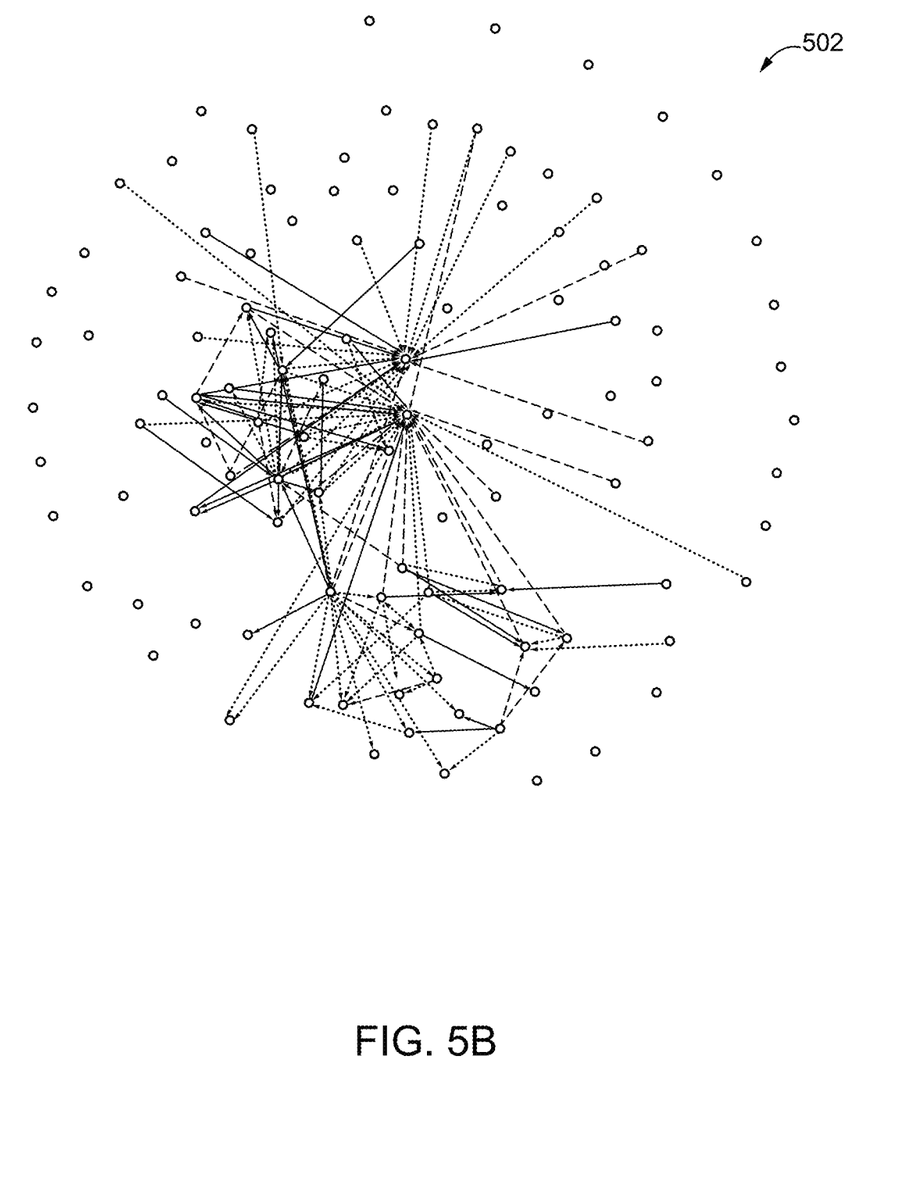
Figure 5C:
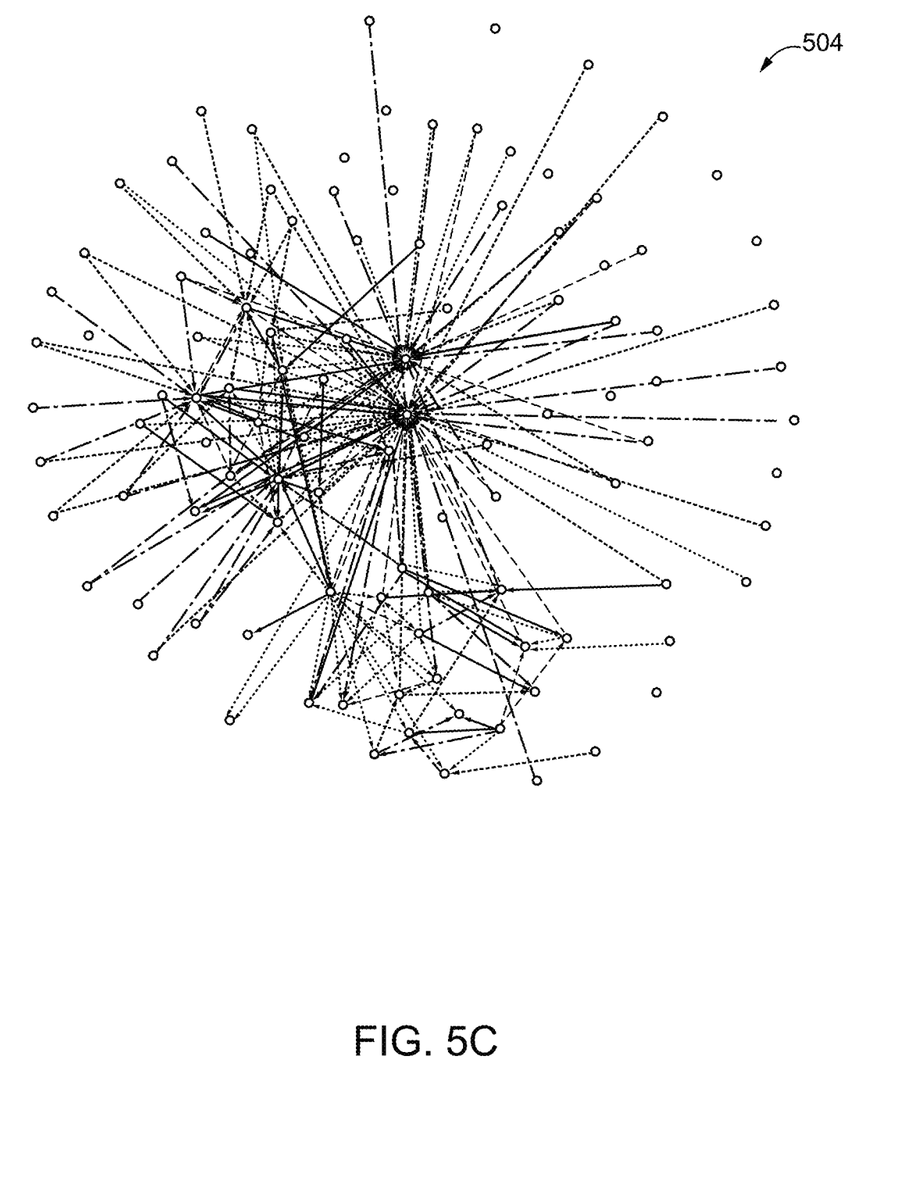
Figure 5D:
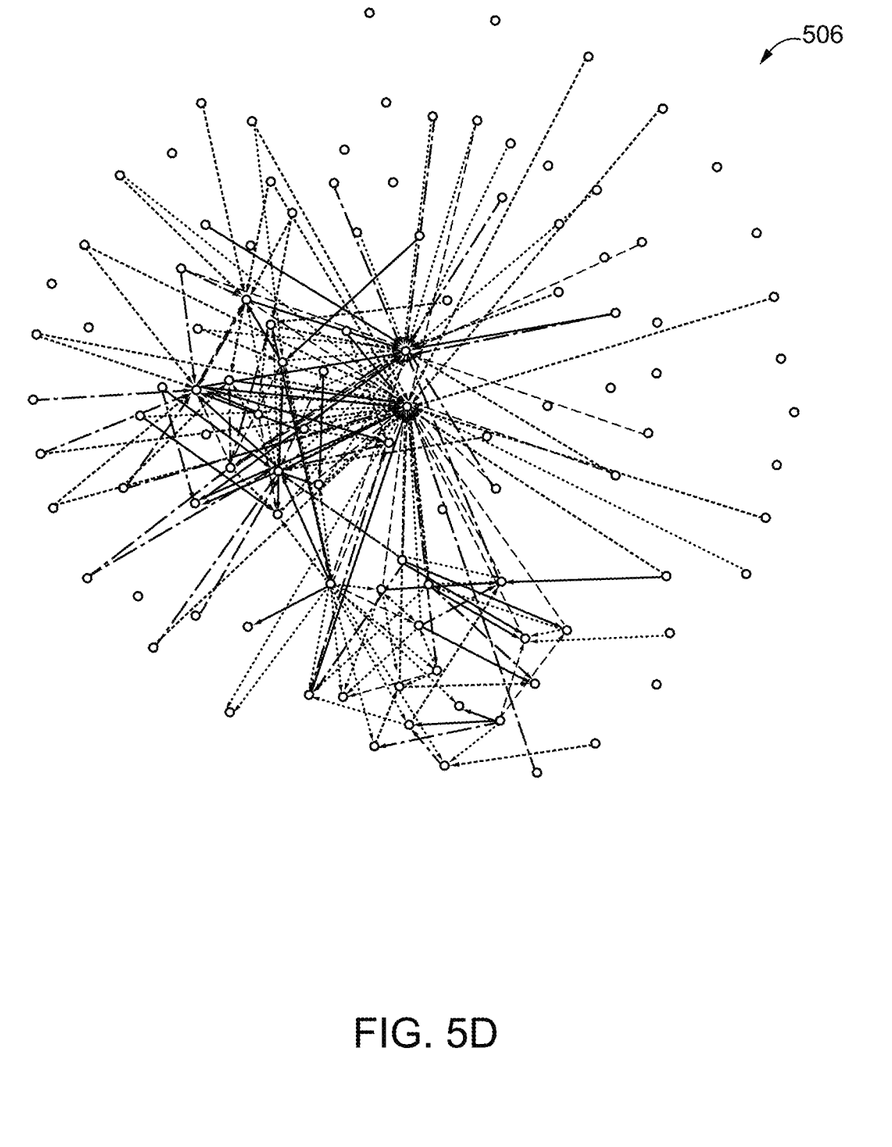

In order to identify the sub-networks $\hat{G}$, the system 100 considers the set of all edges i,j∈ε with the property $w_{ij}(t) \in \mathbb{R}^n$, which can describe time series data indicating traffic volume from i to j or some other vector valued attribute (e.g., click-through rates, conversion rates, or cost information), with or without respect to time. Additionally, in the illustrative embodiment, the system 100 constructs a filtration over the range of $\epsilon = d(e_u, e_w) \in \mathbb{R}$, for each edge, such that it induces a family of simplical complexes $K_X^\epsilon$ over the arbitrary distance metric d and $K_X^\epsilon \subset K_X^{\epsilon'}$ for any $\epsilon' \geq \epsilon$. Further, it should be appreciated that the directedness of the competitive referral ecosystem is implicitly captured in the construction of its source and sink Dowker complexes. The Dowker filtration is sensitive to asymmetry, due to the fact that it does not assume any general metric properties, and is able to capture hub effects in directed small-world network. The Dowker weight function is $$\overline{w}_X(x, x') = \max_{x, x' \in X} \{w(x, x), w(x', x'), w(x, x')\}$$

and the Dowker complex construction is $$\mathfrak{D}_{\delta, X}^{si} = \{\sigma = \text{Pow}(\sigma)\}$$

such that there exists p∈X for $(x,p) \in R_{\delta,x}$ for each x∈σ. An n-simplex $\sigma = [x_1, \ldots, x_n]$ belongs to $\mathfrak{D}^{si}$ whenever there exists a distinguished point p∈X such that $\hat{w}_x(x_i, p) \leq \delta$ for each $x_i \in \sigma$. It should be appreciated that, in the illustrative embodiment, the system 100 identifies the intervals containing persistent one-dimensional structures and evaluates $$v_{ik} = v_{ik}^d + v_{ik}^p = v_{ik}^d + \sum_{j \in \hat{V}} v_{ij}^d P(j \mid i) P(k \mid j \ldots i)$$

as described above over the subgraph containing edges belonging to these cycles, the effect of which is similar to the competitive referral ecosystem 200 of FIG. 2. Another embodiment of a competitive referral ecosystem 400 is shown in FIG. 4.

Referring now to FIGS. 5A-D, the system 100 may execute a method (e.g., the method 600 of FIG. 6) to determine a source domain to target domain relationship according to $$v_{ik} = v_{ik}^d + v_{ik}^p = v_{ik}^d + \sum_{j \in \hat{V}} v_{ij}^d P(j \mid i) P(k \mid j \ldots i)$$

as described above. The computing device 102 and/or the server 106 may make such determinations depending on the particular embodiment. Further, the derived data may be stored in a database (e.g., on the data storage 116) for subsequent recall and utilization, for example, with specialized architecture supporting graph traversal and relationship indexing. Additionally, in some embodiments, statistical optimization of system parameters may be implemented.

FIGS. 5A-D illustrate a competitive referral ecosystem 500, 502, 504, 506 around a central target domain with under decreasing filtration (i.e., shown in stages from the competitive referral ecosystem 500 to the competitive referral ecosystem 506). Similar to the competitive referral ecosystem 200 of FIG. 2, it should be appreciated that the edges of the competitive referral ecosystem 500, 502, 504, 506 are shown with different line styles based on directed temporal dynamics (e.g., varying seasonally, constant, varying linearly over time, etc.).

Figure 6:
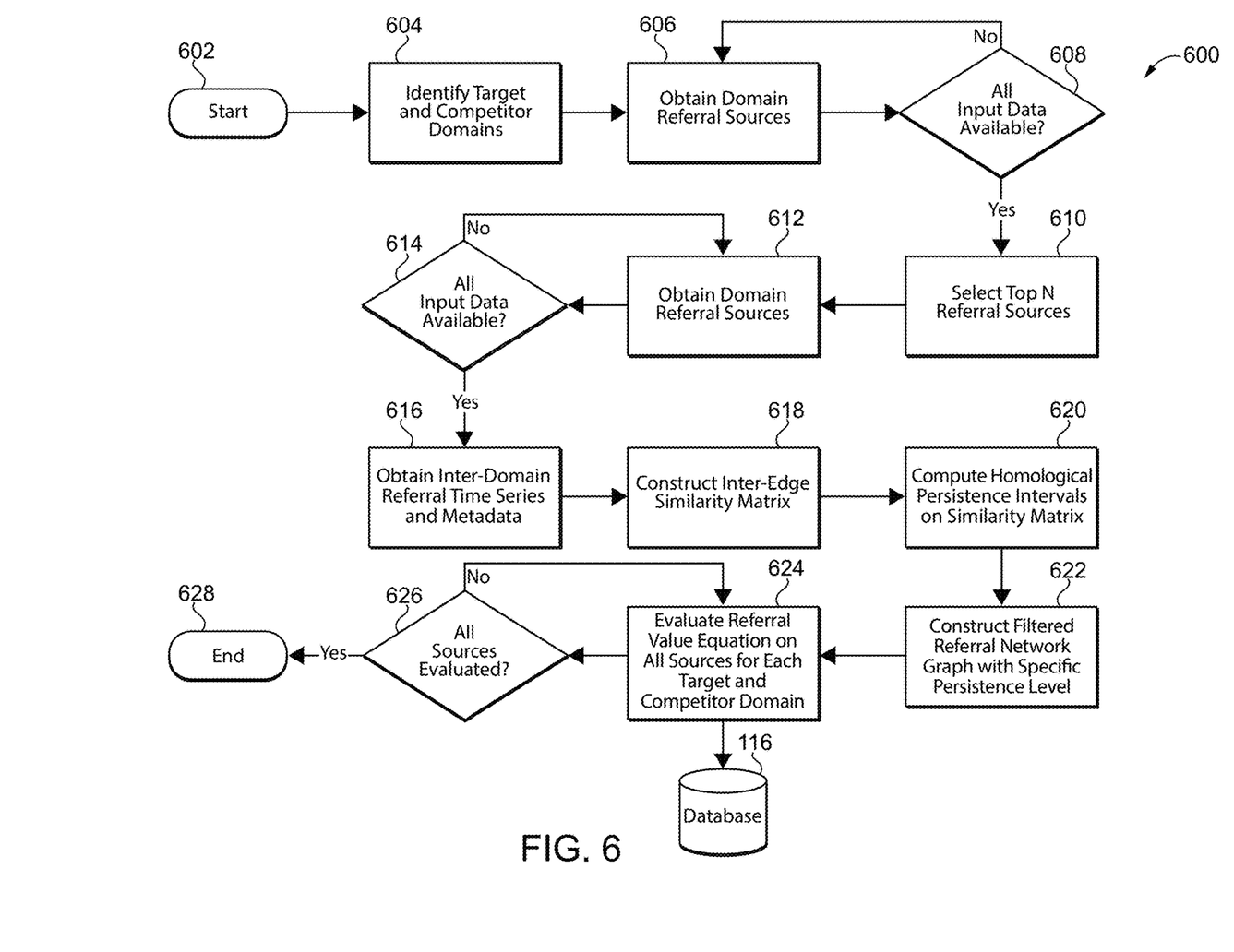
FIG. 6 is a simplified flow diagram of at least one embodiment of a method for web domain ranking with temporal effects within a competitive network environment.

Referring now to FIG. 6, in use, the computing device 102 may execute a method 600 for web domain ranking with temporal effects within a competitive network environment. As indicated above, in some embodiments, the server 106 may execute one or more of the steps of the method 600. It should be appreciated that the method 600 leverages the techniques described above to identify web traffic redirection opportunities for a target domain. As such, the resulting analysis may be used to identify and prioritize those domains with significant redirection value. In the illustrative embodiment, the method 600 is agnostic to the particular content of the domains or domain categories; however, in some embodiments, the computing device 102 may utilize regression-based techniques to further optimize returns on web traffic redirection base on domain metadata and/or other suitable metadata.

The illustrative method 600 begins with block 602 and advances to block 604 in which the computing device 102 identifies the target domain and competitors of the target domain (i.e., competitor domains). The target domain is the domain to which the computing device 102 is attempting to maximize traffic redirection toward (e.g., determined based on user input). For example, as indicated above, the target and competitor domains may be attempting to redirect traffic (e.g., users) from the same set of referral domains. In block 606, the computing device 102 obtains the domain referral sources of the target and competitor domains. It should be appreciated that, in some embodiments, the computing device 102 determines the referral sources based on an analysis of web traffic to the target domain and the competitor domains. In block 608, the computing device 102 determines whether all input data is available associated with those domain referral sources. For example, the computing device 102 may determine whether data associated with a specific number of domain referral sources has been obtained/retrieved and/or utilize one or more algorithms or techniques to make such a determination statistically. In other words, the determination may be stochastic or deterministic depending on the particular embodiment. If all relevant input data has not yet been obtained/retrieved, the method 600 returns to block 606 in which the computing device 102 obtains additional information regarding the domain referral sources. Otherwise, the method 600 advances to block 610 in which the computing device 102 selects a set of the top referral sources (e.g., the top n referral sources). In the illustrative embodiments, the referral sources considered the "top" sources are those that redirect the greatest amount of network traffic to the target domain. It should be appreciated that, depending on the particular embodiment, the top n referral sources can be selected dynamically or statically. For example, in some embodiments, the top referral sources may include all referral sources that have traffic above a certain threshold or satisfy one or more other suitable criteria.

In block 612, the computing device 102 obtains the domain referral sources of the set of the top referral sources (e.g., by analyzing web traffic). In block 614, the computing device 102 determines whether all input data is available associated with those domain referral sources. If not, the method returns to block 612 in which the computing device 102 obtains additional information regarding those domain referral sources. Otherwise, the method 600 advances to block 616 in which the computing device 102 obtains inter-domain referral time series and metadata (e.g., associated with web traffic). That is, the computing device 102 obtains/retrieves network traffic data (e.g., raw or processed/derived data) that indicates the patterns of network traffic between the various web domains in the competitive network environment (e.g., click-through traffic between various web domains). For example, the inter-domain referral relationship between two web domains is defined by the flow in time of network traffic from the first domain to the second domain, and from the second domain to the first domain. The metadata may include, for example, features such as the classification of the domains (e.g., the type of the domain, the channels participated in by the domain, the technologies used by the domain, etc.) and/or other suitable data. As such, in some embodiments, the computing device 102 obtains and leverages a profile of the various web domains in the network. In block 618, the computing device 102 constructs an inter-edge similarity matrix based on the retrieved data. It should be appreciated that the inter-edge similarity matrix may be embodied as an adjacency matrix in some embodiments (e.g., when edge weights are used).

In block 620, the computing device 102 computes homological persistence intervals on the similarity matrix and, in block 622, the computing device 102 constructs a filtered referral network graph with specific persistence levels based on the techniques described above. In block 624, the computing device 102 determines the value $v_{ik}$ for all sources and for each target and competitor domain according to $$v_{ik} = v_{ik}^d + v_{ik}^p = v_{ik}^d + \sum_{j \in \hat{V}} v_{ij}^d P(j \mid i) P(k \mid j \ldots i) \text{ or}$$

$$v_{ik} = v_{ik}^d + v_{ik}^p + \gamma \sum_{c \in V^c} v_{ic}$$

based on the particular embodiment (e.g., whether there are deleterious effects) and the techniques described above. It should be appreciated that the determined values may be stored to (and subsequently retrieved from) a database (e.g., in the data storage 116). In block 626, the computing device 102 determines whether all sources have been evaluated. If not, the method 600 returns to block 624 at which the computing device 102 determines the value $v_{ik}$ for another source. However, if all sources have been evaluated, the method 600 advances from block 626 to block 628 at which the method 600 is concluded. In some embodiments, the execution of the method 600 results in an expected value of various domains within a selected context. For example, if the most important blog in terms of network traffic redirection in an ecosystem/network is of interest, the blogs in the ecosystem can be extracted/filtered (e.g., based on relevant metadata) and the blog-related domains can be ranked based on the value function as described above. It should be appreciated that the method 600 assumes that h=2 as described above. However, in embodiments in which h=3, the computing device 102 may further select the top referral sources of the domain referral sources identified in block 612 (and so on for embodiments in which h>3) prior to the execution of block 616. Further, in some embodiments, the method 600 may form a portion of another method.

It should be further appreciated that the techniques described herein may be applied to solve various other technical problems associated with computer networks. For example, in some embodiments, the method 600 may be augmented to analyze the effects of multiple web domains operating in concert. That is, the method 600 may be applied to determine a collection of domains whose collective interactions and network properties would have a positive effect for a target domain if acted on in tandem, which may take advantage of the non-linear interaction effects of domains in the temporal network, following diffusion optimization processes. Additionally, such strategies could also be applied to a specific competitor domain.

What is claimed is:

1. A method for web domain ranking with temporal effects within a competitive computer network environment, the method comprising:
    mapping the competitive computer network environment based on network connections between web domains within the competitive computer network environment, wherein the web domains include at least a target domain and a plurality of source domains;
    determining persistence properties of the network connections between the web domains to identify network connections that are expected to persist for at least a threshold period of time;
    determining, for each source domain of the plurality of source domains having a network connection with the target domain expected to persist for at least the threshold period of time, a referral value indicative of an amount of network traffic directed from the source domain to the target domain; and
    ranking the source domains based on the corresponding referral values,
    wherein the referral value is based on direct network traffic from the source domain to the target domain and indirect propagation of network traffic from the source domain to the target domain through at least one web domain intermediate the source domain and the target domain,
    wherein the referral value is determined according to $v_{ik} = v_{ik}^d + v_{ik}^p$,
    wherein $v_{ik}$ is the referral value of the source domain, i, to the target domain, k,
    wherein $v_{ik}^d$ is a direct value indicative of the direct network traffic from the source domain to the target domain, and
    wherein $v_{ik}^p$ is a propagation value indicative of the indirect propagation of network traffic from the source domain to the target domain.

2. The method of claim 1, wherein the referral value is further based on a deleterious effect on network traffic from the source domain to at least one web domain competitive to the target domain.

3. The method of claim 1, wherein the propagation value, $v_{ik}^p$, indicative of the indirect propagation of network traffic from the source domain to the target domain is determined according to $$\sum_{j \in \hat{V}} v_{ij}^d P(j \mid i) P(k \mid j \ldots i),$$

wherein j∈V̂ is a subset of web domains within the competitive computer network environment having network connections with both the source domain and the target domain, wherein $v_{ij}^d$ is a value indicative of direct network traffic from the source domain, i, to an intermediate web domain, j, wherein P(j|i) is a conditional probability of a link from the source domain to the intermediate web domain, and wherein P(k|j . . . i) is a conditional probability of a link from the source domain to the intermediate domain and subsequently from the intermediate domain to the target domain, k.

4. The method of claim 1, wherein mapping the competitive computer network environment comprises determining network traffic between the web domains within the competitive computer network environment.

5. The method of claim 4, wherein determining the network traffic between the web domains comprises retrieving traffic data from a database.

6. A method for web domain ranking with temporal effects within a competitive computer network environment, the method comprising:
   mapping the competitive computer network environment based on network connections between web domains within the competitive computer network environment, wherein the web domains include at least a target domain and a plurality of source domains;
   determining persistence properties of the network connections between the web domains to identify network connections that are expected to persist for at least a threshold period of time;
   determining, for each source domain of the plurality of source domains having a network connection with the target domain expected to persist for at least the threshold period of time, a referral value indicative of an amount of network traffic directed from the source domain to the target domain; and
   ranking the source domains based on the corresponding referral values,
   wherein mapping the competitive computer network environment comprises isolating a subgraph of a scale-free graph of the Internet including the target domain and a set of competitive web domains.

7. The method of claim 6, wherein isolating the subgraph comprises isolating a subgraph that further includes each web domain connected to one or more of the target domain or a competitive domain by no more than a threshold number of network connections.

8. The method of claim 7, wherein the threshold number of network connections is between two connections and three connections.

9. The method of claim 6, wherein the web domains include a plurality of target domains;
   wherein the target domains include at least one competitive web domain; and
   further comprising determining the referral value and ranking the source domains based on the corresponding referral values for each target domain of the plurality of target domains.

10. A computing system, comprising:
    at least one processor; and
    at least one memory comprising a plurality of instructions stored thereon that, in response to execution by the at least one processor, causes the computing system to:
    map a competitive computer network environment based on network connections between web domains within the competitive computer network environment, wherein the web domains include at least a target domain and a plurality of source domains;
    determine persistence properties of the network connections between the web domains to identify network connections that are expected to persist for at least a threshold period of time:
    determine, for each source domain of the plurality of source domains having a network connection with the target domain expected to persist for at least the threshold period of time, a referral value indicative of an amount of network traffic directed from the source domain to the target domain; and
    rank the source domains based on the corresponding referral values,
    wherein the referral value is based on direct network traffic from the source domain to the target domain and indirect propagation of network traffic from the source domain to the target domain through at least one web domain intermediate the source domain and the target domain,
    wherein the referral value is determined according to $v_{ik} = v_{ik}^d + v_{ik}^p$,
    wherein $v_{ik}$ is the referral value of the source domain, i, to the target domain, k,
    wherein $v_{ik}^d$ is a direct value indicative of the direct network traffic from the source domain to the target domain, and
    wherein $v_{ik}^p$ is a propagation value indicative of the indirect propagation of network traffic from the source domain to the target domain.

11. The computing system of claim 10, wherein the referral value is further based on a deleterious effect on network traffic from the source domain to at least one web domain competitive to the target domain.

12. The computing system of claim 10, wherein the propagation value, $v_{ik}^p$, indicative of the indirect propagation of network traffic from the source domain to the target domain is determined according to $$\sum_{j \in \hat{V}} v_{ij}^d P(j \mid i) P(k \mid j \ \ldots \ i),$$

wherein j∈V̂ is a subset of web domains within the competitive computer network environment having network connections with both the source domain and the target domain, wherein $v_{ij}^d$ is a value indicative of direct network traffic from the source domain, i, to an intermediate web domain, j, wherein P(j|i) is a conditional probability of a link from the source domain to the intermediate web domain, and wherein P(k|j . . . i) is a conditional probability of a link from the source domain to the intermediate domain and subsequently from the intermediate domain to the target domain, k.

13. The computing system of claim 12, A computing system, comprising:
    at least one processor; and
    at least one memory comprising a plurality of instructions stored thereon that, in response to execution by the at least one processor, causes the computing system to:
    map a competitive computer network environment based on network connections between web domains within the competitive computer network environment, wherein the web domains include at least a target domain and a plurality of source domains;

determine persistence properties of the network connections between the web domains to identify network connections that are expected to persist for at least a threshold period of time;

determine, for each source domain of the plurality of source domains having a network connection with the target domain expected to persist for at least the threshold period of time, a referral value indicative of an amount of network traffic directed from the source domain to the target domain; and rank the source domains based on the corresponding referral values, wherein to map the competitive computer network environment comprises isolation of a subgraph of a scale-free graph of the Internet that includes the target domain and a set of competitive web domains.

14. The computing system of claim 13, wherein the subgraph further includes each web domain connected to one or more of the target domain or a competitive domain by no more than a threshold number of network connections.

15. The computing system of claim 13, wherein the web domains include a plurality of target domains;

wherein the target domains include at least one competitive web domain; and wherein the plurality of instructions further causes the computing system to determine the referral value and rank the source domains based on the corresponding referral values for each target domain of the plurality of target domains.

* * * * *

UNITED STATES PATENT AND TRADEMARK OFFICE
CERTIFICATE OF CORRECTION

| | | |
|---|---|---|
| PATENT NO. | : 10,664,550 B1 | Page 1 of 1 |
| APPLICATION NO. | : 15/886022 | |
| DATED | : May 26, 2020 | |
| INVENTOR(S) | : Tyler Foxworthy | |

It is certified that error appears in the above-identified patent and that said Letters Patent is hereby corrected as shown below:

In the Claims

Column 16, Line 59, cancel the text "The computing system of claim 12,".

Signed and Sealed this
Thirtieth Day of June, 2020

Andrei Iancu
*Director of the United States Patent and Trademark Office*